US007113111B2

(12) United States Patent
Tyneski et al.

(10) Patent No.: US 7,113,111 B2
(45) Date of Patent: Sep. 26, 2006

(54) KEYBOARD ARRANGEMENT FOR HANDHELD ELECTRONIC DEVICES

(75) Inventors: Frank Matthew Tyneski, Kitchener (CA); Jason Tyler Griffin, Waterloo (CA)

(73) Assignee: Research in Motion Limited, Waterloo (CA)

( * ) Notice: Subject to any disclaimer, the term of this patent is extended or adjusted under 35 U.S.C. 154(b) by 322 days.

(21) Appl. No.: 10/786,000

(22) Filed: Feb. 26, 2004

(65) Prior Publication Data

US 2005/0190083 A1 Sep. 1, 2005

(51) Int. Cl.
*H03M 11/00* (2006.01)
(52) U.S. Cl. .................. 341/20; 400/486; 400/489
(58) Field of Classification Search .................. 341/20, 341/22; 400/486, 489; 361/680
See application file for complete search history.

(56) References Cited

U.S. PATENT DOCUMENTS

| 5,267,127 | A | * | 11/1993 | Pollitt | 361/680 |
| 5,626,428 | A | * | 5/1997 | Miwa | 400/486 |
| 5,660,488 | A | * | 8/1997 | Miller | 400/486 |
| 6,195,839 | B1 | * | 3/2001 | Patterson et al. | 16/334 |
| 6,278,442 | B1 | | 8/2001 | Griffin et al. | |
| 6,396,482 | B1 | | 5/2002 | Griffin et al. | |
| 6,452,588 | B1 | | 9/2002 | Griffin et al. | |
| 6,467,979 | B1 | * | 10/2002 | Camacho et al. | 400/489 |
| 6,489,950 | B1 | | 12/2002 | Griffin et al. | |
| 6,628,511 | B1 | | 9/2003 | Engstrom | |
| 6,657,560 | B1 | * | 12/2003 | Jung | 341/22 |
| 6,726,106 | B1 | * | 4/2004 | Han et al. | 235/472.01 |
| 2003/0063070 | A1 | | 4/2003 | Kang | |

FOREIGN PATENT DOCUMENTS

WO   WO 02/075514 A2   9/2002
WO   WO 03/056784 A2   7/2003

OTHER PUBLICATIONS pages from website—www.good.com/index.php/good_g100.html.

* cited by examiner

*Primary Examiner*—Albert K. Wong
(74) *Attorney, Agent, or Firm*—Bereskin & Parr

(57) ABSTRACT

A handheld electronic device configured for thumb-typing by a user is disclosed. The handheld electronic device comprises a display and a keyboard comprising a first group of keys and a second group of keys. The first and second group of keys are arranged into a plurality of rows. Each of the plurality of rows make an angle generally between 30 and 50 degrees with respect to a longitudinal midline of the device.

18 Claims, 3 Drawing Sheets

KEYBOARD ARRANGEMENT FOR HANDHELD ELECTRONIC DEVICES

FIELD OF THE INVENTION

This invention relates to a keyboard arrangement for a handheld electronic device. In particular, the invention relates to a keyboard arrangement for reducing the size of a handheld electronic device.

BACKGROUND OF THE INVENTION

Portable hand-held electronic devices such as a Personal Data Assistant (PDA), a two-way pager or a two-way email-messaging device are becoming increasingly important. However, to improve portability and hence widespread usage of these devices, the size of these devices must be reduced. Due to current electronic technology, the thickness of hand-held electronic devices is at an acceptable level. However, device users would like to see a reduction in the width of these handheld devices. In fact some users would prefer a handheld device that resembles a cell phone in which the handheld device may be slightly increased in length but reduced in width.

The electronic components that are used to construct these handheld devices can facilitate a size reduction for virtually any dimension of the device. However, it is the conventional physical user interface, such as the display and the input devices (i.e. keyboard), which places a limitation on the reduction in the length and width of these devices. The display must be maintained at a certain size so that user interaction with the device is not degraded based on the functionality that the device is providing for the user (such as text messaging, web-surfing or game-playing). Accordingly, there is a need for an alternative configuration for the input device that will facilitate a reduction in size for the hand-held electronic device.

The main input device for hand-held electronic devices is a keyboard. Keyboards are typically laid out in the QWERTY fashion. QWERTY is a reference to the order of the keys starting with the left most key in the uppermost row of the keyboard. In the standard QWERTY keyboard layout, the letter keys are laid out in three rows with a minimum of seven letter keys per row. In addition, special function keys are usually provided for entering numerals, punctuation or for editing purposes (i.e. the spacebar key, the return key, the delete key, etc.). Foreign language keyboards follow a similar keyboard layout that is referred to as an AZERTY or QWERTZ format.

In order to reduce the size of the keyboard, one may reduce the number of letter keys by combing several letters on one key. Another option is to provide a key with more than one function. For instance, some keys can represent a letter and a number, or a letter and an editing feature. Another key can be depressed, such as an ALT key, to choose between the symbol or function that a given key provides. However, if not done properly, a reduction in the number of keys may reduce the usefulness of the input device. For instance, it may take longer for the user to interact with the handheld device which will lead to frustration on the part of the user. This is unacceptable since it is desirable to have a handheld device with a smaller keyboard that allows the user to maintain typing speed and accuracy. In addition, following a standard QWERTY layout in which the keys are provided in substantially horizontal rows still results in a handheld device in which the width of the device is not greatly reduced.

Another problem with the QWERTY layout is that the user will typically grip the handheld device such that their fingers support the handheld device and their thumbs are used for typing. Consequently, a variety of thumb movements are required in order to reach all of the keys on the keyboard. These thumb movements for conventional QWERTY keyboards generally involve a combination of multi-directional movements that are not naturally occurring movements of the thumbs. This will lead to premature user fatigue.

Accordingly, there is a need for handheld devices with a keyboard interface that is compact yet at the same time functional. The keys of the keyboard should be arranged to reduce the size of the keyboard interface while at the same time better reflecting the natural movements of the human thumb as well as maintaining functionality and ease of use.

SUMMARY OF THE INVENTION

The invention comprises a V-shaped keyboard layout for a handheld device that results in a reduction in the width of the handheld device compared to a similar handheld device that employs a conventional QWERTY keyboard. A variety of angles can be used for the rows of the V-shaped keyboard to vary the width of the handheld device. Further, the shape of the keyboard is such that the keys conform to the natural movements of the user's thumbs and simply allow the user to move his/her thumbs in arced movements while holding the device with their fingers. The result is that the user's hands do not get fatigued as quickly as they would if the user was interacting with a conventional keyboard in which the user has to vertically extend and retract their thumbs which is both uncomfortable and tiresome.

The rows of the V-shaped keyboard can be at the same angle with respect to a longitudinal midline of the handheld device. Alternatively, and more preferably, the rows of the V-shaped keyboard can be at a different angle with respect to the longitudinal midline. For instance, if the V-shaped keyboard has three rows, the bottom row can be at a larger angle than the middle row, and the middle row can be at a larger angle than the top row. This layout allows the user's thumbs to more naturally move over the keys as well as allow for a contoured shape for the sides of the handheld electronic device.

In a further alternative, it is preferable to provide a slight convex arc for each row of the V-shaped keyboard to further accommodate the natural movement of the user's thumbs as well as reduce the width of the keyboard.

Preferably, the order and rows of the keys in the V-shaped keyboard remain in the same order as a conventional QWERTY layout so that the user does not have to learn a new keyboard layout. Further, the width of the keys in the V-shaped keyboard can be reduced in size compared to the width of the keys in a conventional keyboard. However, the height of the keys is increased to maintain an acceptable footprint for the keys of the V-shaped keyboard. This allows the user to accurately depress intended keys on the V-shaped keyboard and avoid hitting more than one key at the same time. The layout of the V-shaped keyboard and the shape of the keys allow the user to maintain the same typing speed and accuracy that they would have while typing on a conventional QWERTY keyboard.

In addition, the width reduction that is provided by the keyboard of the invention allows the handheld device to more closely approximate the shape and ergonomics of conventional mobile phones. Accordingly, a handheld device that also provides phone functionality can incorporate the keyboard of the invention.

In accordance with a first aspect, the invention provides a handheld electronic device configured for thumb-typing by a user. The handheld electronic device comprises a display; and a keyboard comprising a first group of keys and a second group of keys. The first and second group of keys are arranged into a plurality of rows. Each of the plurality of rows make an angle generally between 30 and 50 degrees with respect to a longitudinal midline of the device.

Each group of keys comprises a first row of keys, a second row of keys and a third row of keys. The first row of keys are disposed above the second row of keys and the second row of keys are disposed above the third row of keys. The first row of keys make a first angle with respect to the longitudinal midline, the second row of keys make a second angle with respect to the longitudinal midline and the third row of keys make a third angle with respect to the longitudinal midline. The first, second and third angles may be substantially similar.

Alternatively, and more preferably, the first, second and third angles are different. In particular, the third angle is larger than the second angle and the second angle is larger than the first angle. Preferably, the first angle is chosen to be between about 30 and 40 degrees. Further, the second angle is chosen to be between about 34 and 44 degrees. Also, the third angle is chosen to be between about 40 and 50 degrees.

In accordance with a second aspect, the invention provides a keyboard for use with a handheld electronic device. The keyboard comprises a first group of keys and a second group of keys, wherein the first and second group of keys are arranged into a plurality of rows. Each of the plurality of rows making an angle generally between 30 and 50 degrees with respect to a longitudinal midline of the device.

BRIEF DESCRIPTION OF THE DRAWINGS

For a better understanding of the invention and to show more clearly how it may be carried into effect, reference will now be made, by way of example only, to the accompanying drawings which show exemplary embodiments of the invention and in which.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention.

Figure 1:
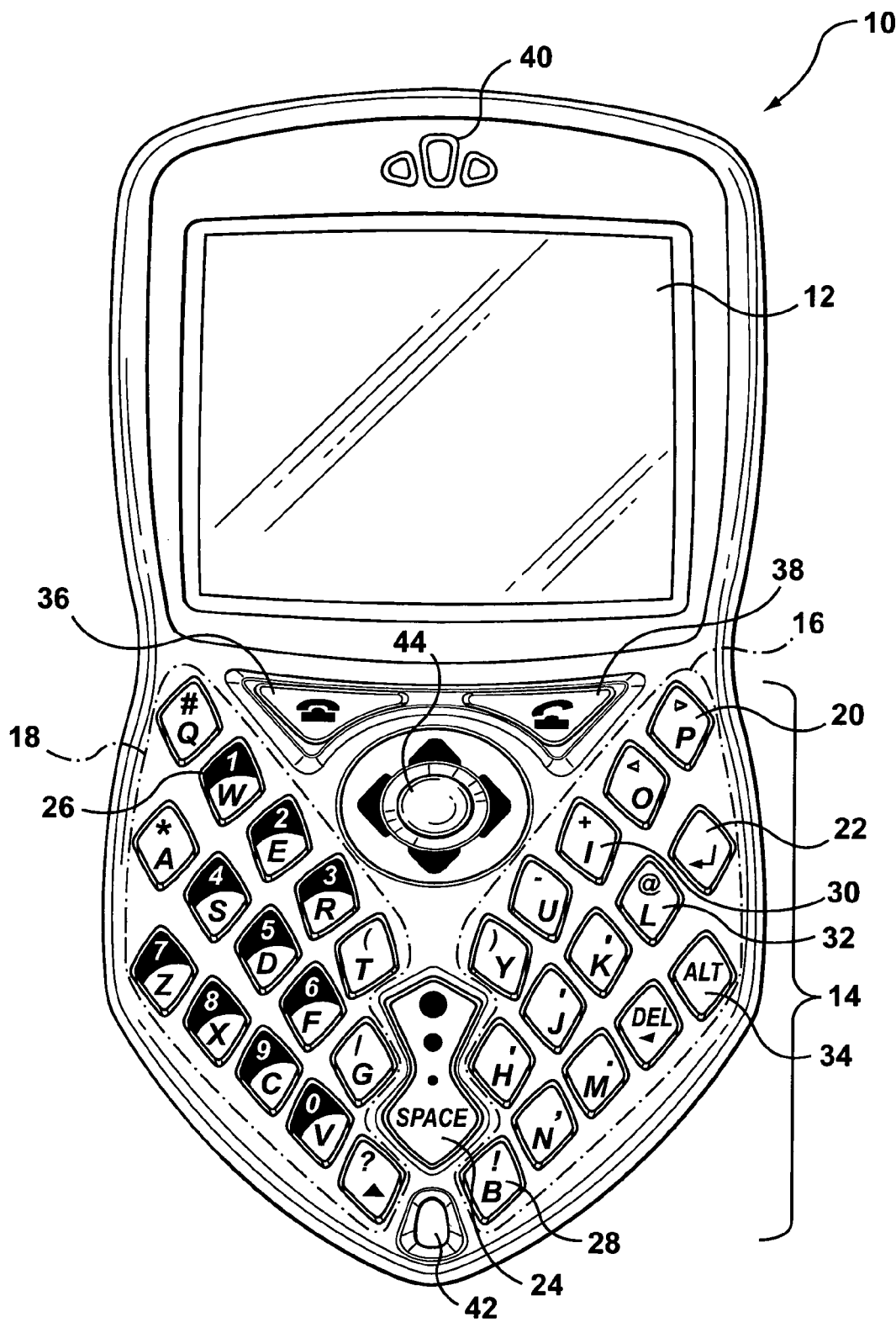
FIG. 1 is a front view of a handheld electronic device with a keyboard in accordance with the invention.

Referring now to FIG. 1, shown therein is a front view of a handheld electronic device 10 that includes a display 12 and a keyboard 14 in accordance with the invention. The handheld electronic device 10 does not specifically relate to any one particular type of device but is shown for exemplary purposes to demonstrate an embodiment of the keyboard 14 of the invention. It should be understood by those skilled in the art that the handheld electronic device 10 contains other components, such as a processor, a transceiver, memory, etc. and associated software to implement the functionality of the device. Those skilled in the art are knowledgeable of these components. Hence, these components will not be shown or described.

The keyboard 14 comprises a plurality of keys generally configured into a first group of keys 16 and a second group of keys 18. The keys include letter keys, such as the key 20 which represents the letter P, and editing keys such as the RETURN key 22 which is represented by the symbol ↵. The keyboard 14 also includes a spacebar key 24 located between the two groups of keys 16 and 18. The location of the spacebar key 24 simplifies the movement required for the user's thumb to depress the spacebar key 24. In particular, the location of the spacebar key 24 allows the user to use either the right or left thumb to depress the spacebar key 24. In addition, it should be noted that the spacebar key 24 is vertically disposed on the keyboard 14. This allows for a reduction in the width of the keyboard 14 without necessarily having to reduce the size of the spacebar key 24. The spacebar key 24 also has concave sides which allows the spacebar key 24 to be placed in an "interlocking" or mating fashion with the adjacent keys from the first and second groups of keys 16 and 18. These adjacent keys are shaped in a diamond configuration with convex outer sides. The shape of the keys is described in more detail below.

The total number of the keys in the keyboard 14 is less than the number of keys that are contained on a conventional QWERTY keyboard that is used for a personal computer. The reduction in the number of the keys in the keyboard 14 provides a first means for reducing in the physical size of the keyboard 14. The number of keys have been reduced by using a key for more than one function. For instance, a key can represent a letter and a number such as key 26, a key can represent a letter and a punctuation mark such as key 28, a key can represent a letter and a mathematical operation such as key 30, or a key can represent a letter and a symbol such as key 32. If the user desires to select the alternate functionality or the secondary characters that are provided by a key, then the user can depress the key at the same time as depressing the ALT key 34. The number of keys in the keyboard 14 and the functionality/symbols provided by the keys of the keyboard 14 do not have to strictly follow what has been described in this embodiment.

The user interface for the handheld electronic device 10 also includes a pair of special function keys 36 and 38. In this particular embodiment, the special function keys 36 and 38 can be used to start and end a telephone conversation using the handheld electronic device 10. In other types of handheld electronic devices, the special function keys 36 and 38 may be omitted. The handheld electronic device 10 also allows the user to connect to a remote base station so that the user can send and receive emails, use the internet and the like.

In this exemplary embodiment, the handheld electronic device 10 can also be used as a mobile phone. Accordingly, the handheld electronic device 10 includes a speaker 40 situated at an upper portion where the user would put their ear. The device 10 also includes a microphone (not shown) situated at a bottom portion or edge. A standard speaker and microphone can be used as is known by those skilled in the art. The smaller keyboard 14 allows the device 10 to follow the shape and ergonomics of conventional mobile phones while providing the functionality of a PDA. The handheld electronic device 10 also includes an aperture 42, also known as a lanyard hole, which allows the user to attach the handheld electronic device to a chain or rope so that the user does not lose the handheld electronic device 10.

The user interface for the handheld electronic device 10 also includes a navigation pad 44 that is located between the first and second group of keys 16 and 18 (alternatively a thumbwheel with associated scroll keys can be used). The navigation pad 44 can be used to scroll through information that is shown on the display 12. For instance, the user may be reading a long email message that cannot be fully shown on the display 12. Accordingly, the user actuates the navigation pad 44 to scroll through the email message. The navigation pad 44 may also provide other functionality such as a selection feature. For instance, the user may want to navigate internet web pages using the handheld electronic device 10. Accordingly, the user can depress the navigation pad 44 to select a particular web link on a web page, or to open an application. Advantageously, the navigation pad 44 is located between the first and second groups of keys 16 and 18 which simplifies the movement required for the user's thumb to actuate the navigation pad 44. In particular, the location of the navigation pad 44 allows the user to extend and slightly rotate the right or left thumb to actuate the navigation pad 44.

The location of the spacebar key 24, the pair of special function keys 36 and 38 and the navigation pad 44 is not restricted to what is shown in FIG. 1. Although the locations shown in FIG. 1 are preferable, it may be possible for the spacebar key 24, the pair of special function keys 36 and 38 and the navigation pad 44 to be located at other areas of the handheld electronic device 10. Alternatively, depending on the functionality of the handheld electronic device 10, it is not necessary for the pair of special function keys 36 and 38 and/or the navigation pad 44 to be included on the handheld electronic device 10. Their functionality may not be needed, or alternative methods can be used to provide their functionality.

Figure 2:
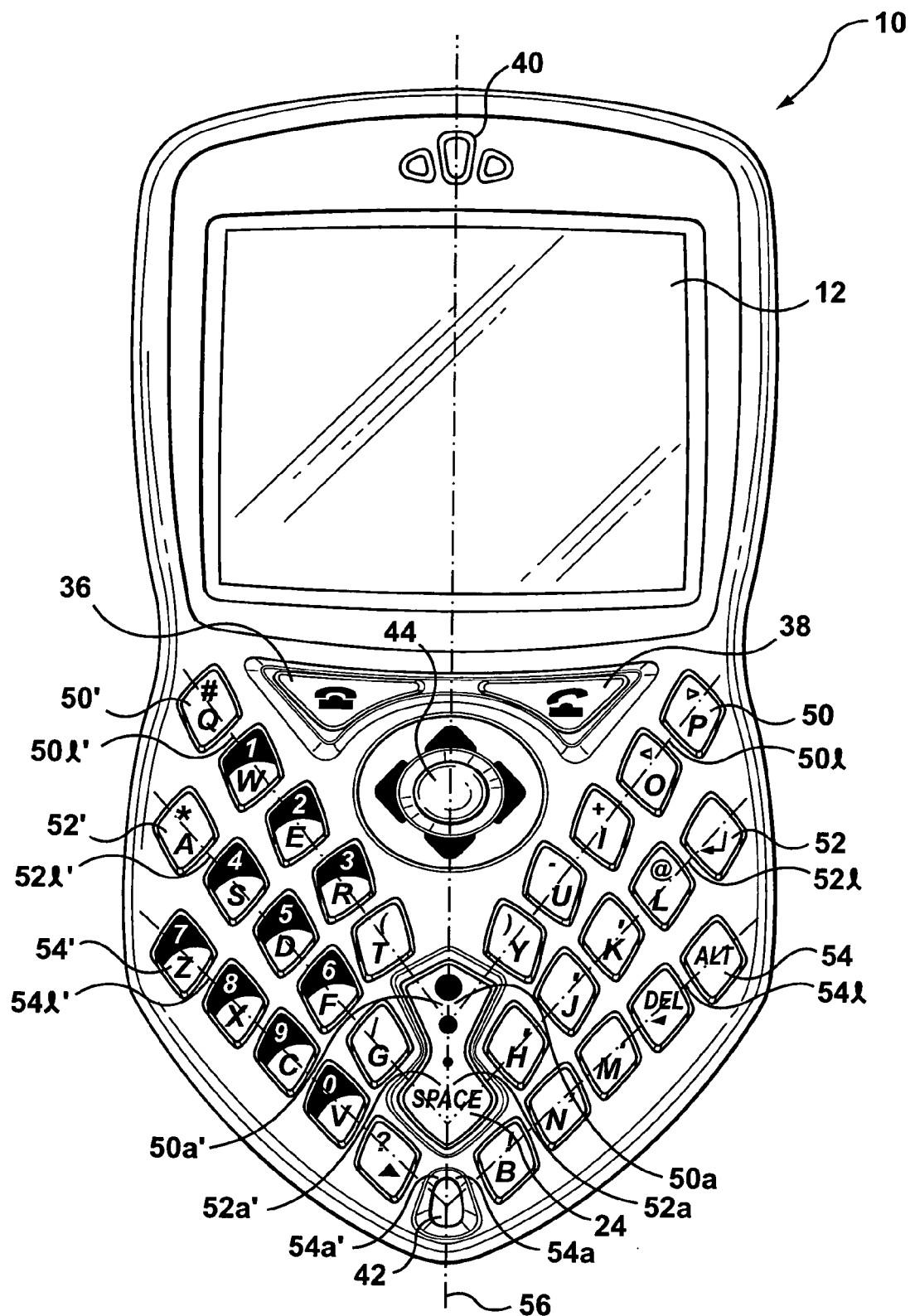
FIG. 2 is a front view of the handheld electronic device of FIG. 1 illustrating geometrical properties of the layout for the keys of the keyboard; and, FIG. 3 is a front view of another embodiment of the handheld electronic device with a keyboard in accordance with the invention.

Referring now to FIG. 2, shown therein is a front view of the handheld electronic device 10 illustrating geometrical properties of the layout of the keys in the keyboard 14. The keys in the keyboard 14 are arranged in multiple rows. The first group of keys 16 includes a first row of keys 50, a second row of keys 52 and a third row of keys 54. Likewise, the second group of keys 18 includes a first row of keys 50', a second row of keys 52' and a third row of keys 54'.

In addition, the first group of keys 16 and the second group of keys 18 are divided by a longitudinal midline 56 of the handheld electronic device 10. In this exemplary embodiment, the spacebar key 24 and the navigation pad 44 straddle the longitudinal midline 56 in a symmetrical fashion. Further, the first and second group of keys 16 and 18 and the special function keys 36 and 38 are symmetrically oriented about the longitudinal midline 56. This use of symmetry further enhances the user interactivity with the handheld electronic device 10.

Each of the rows of keys 50, 50', 52, 52', 54 and 54' contain an equivalent number of keys. This allows the keyboard 14 to be arranged in a more symmetrical, compact form. Further, the rows of keys 50, 50', 52, 52', 54 and 54' are generally arranged along lines 50I, 50I', 52I, 52I', 54I and 54I'. The keys may be disposed in a linear manner along the lines 50I, 50I', 52I, 52I', 54I and 54I'. Alternatively, as is shown in FIG. 2, the keys can be disposed in an arced fashion along the lines 50I, 50I', 52I, 52I', 54I and 54I' such that the keys form a slight convex arc along each row 50, 50', 52, 52', 54 and 54'. This convex arc allows the user's thumb to more naturally move along the keys of the keyboard 14. Further, the arc allows for the keys to be placed slightly closer to each other and hence reduce the width of the keyboard.

The lines 50I, 50I', 52I, 52I', 54I and 54I' along which the rows of keys 50, 50', 52, 52', 54 and 54' are generally disposed respectively form angles 50a, 50a', 52a, 52a', 54a and 54a' with the longitudinal midline 56 of the handheld electronic device 10. The angles 50a, 52a and 54a form positive angles with respect to the longitudinal midline 56 and the angles 50a', 52a' and 54a' form negative angles with respect to the longitudinal midline 56. Each opposite angle will be substantially similar, i.e. angles 50a and 50a' will be substantially similar, angles 52a and 52a' will be substantially similar and angles 54a and 54a' will be substantially similar to ensure continuity for the symmetry of the device 10. To simplify the remainder of the description, the orientation of the rows and the associated angles will be described for the first group of keys 16. It should be understood that similar values can be used for the second group of keys 18.

The use of appropriate values for the angles 50a, 52a and 54a allow the width of the handheld electronic device 10 to be reduced. In general, selecting a higher value for the angles 50a, 52a and 54a results in a reduction of the width and an increase in the length of the handheld electronic device 10. Accordingly, it is desirable to select values for the angles 50a, 52a and 54a such that there is a tradeoff between width reduction and length increase as well as providing a key layout that accommodates the natural movement of the user's thumbs during thumb-typing. In particular, the inventors have found that selecting values for the angles 50a, 52a and 54a in the range of 30 to 50 degrees is beneficial for reducing the width of the keyboard 14 while allowing the user's thumb to naturally move over the keys in various rows of the keyboard 14.

Alternatively, and more preferably, the angles 50a, 52a and 54a of each row of keys 50, 52 and 54 do not necessarily have to be the same. In one instance, the angles 50a, 52a and 54a may have similar values. However, and more preferably, the angles 50a, 52a and 54a have different values. For instance, the inventors have found that it is beneficial for angle 54a to be larger than angle 52a and for angle 52a to be larger than angle 50a. In particular, the inventors have found that it is preferable that angle 54a is generally within a range of between 40 and 50 degrees, that angle 52a is generally within a range of 34 and 44 degrees and that angle 50a is generally within a range of 30 and 40 degrees with respect to the longitudinal midline 56 of the handheld electronic device 10. In one preferred exemplary embodiment, the angle 54a is approximately 48 degrees, the angle 52a is approximately 44 degrees and the angle 50a is approximately 40 degrees. This results in a width of approximately 60 mm for the device 10 when the keys have a height of 8 mm and a width of 5 mm and a height of approximately 26 mm for the inner portion of the group of keys 16 and 18. This keyboard allows for a width reduction in the device of approximately 10 to 15 mm compared to a more traditional keyboard layout.

The use of different values for the angles 50a, 52a and 54a allow the lateral extent of each row 50, 52 and 54 to be varied with respect to the longitudinal midline 56. This allows the sides of the housing of the handheld electronic device 10 to be contoured. For instance, angle 54a may be larger than angle 52a and angle 52a may be larger than angle 50a. This allows the sides of the housing to be contoured inwards as one moves up the row of keys which results in the handheld electronic device having a housing with concave sides. This concave side allows the user to more effectively grip the handheld electronic device 10 in one or two hands. The concave sides of the handheld electronic device 10 can also be slightly serrated or have ridges on them to provide the user with a better grip on the handheld electronic device 10.

The use of different values for the angles 50a, 52a and 54a also results in a greater amount of space between adjacent rows for the keys in the outer portion of the rows that are above one another. For instance, there is more space between the ALT key 34 in row 54 and the ⏎key 22 in row 52 compared to the space between the B key in row 54 and the H key in row 52. This is beneficial since the user's thumbs are in a more vertical position near the outer portions of the rows of keys and in the vertical position, it is not as easy for the user's thumb to navigate between keys.

The keys of the keyboard 14 can have a variety of shapes such as circular, oval, square, rectangular, etc. However, to increase the compactness of the keyboard 14, it is preferable for the keys to have a shape that allows for placing the keys in an interlocking or dovetail manner. Accordingly, the keys preferably have a shape such that sides of adjacent keys in a given row complement one another especially given the fact that the rows of keys are on an angle. The inventors have found that it is preferable for the keys to have a diamond shape since the right upper and left lower diagonal sides of the diamond shape allow adjacent keys on a given row of the keyboard 14 to be placed closer to one another.

The keys of the keyboard 14 may also have different sizes. For instance, keys that are used more often can have a larger size than the other keys in the keyboard 14. However, to increase the compactness of the keyboard 14 and to maintain continuity for data entry, it is preferable for the keys of the keyboard 14 to be similarly sized. For reducing the width of the device 10, it is also preferable to reduce the width of the keys compared to those used in conventional keyboards. However, the height of the keys is increased to maintain an acceptable footprint for the keys of the V-shaped keyboard. The keys are also sized such that they are large enough for appropriate contact to be made by the user's thumb and are sufficiently spaced apart so that the user does not depress multiple keys during one keystroke. As an example, the keys may have a height of 8 mm and a width of 5 mm.

The arrangement of the keys of the keyboard 14 of the invention allow for a narrower handheld electronic device while maintaining the functionality of a conventional keyboard that has keys laid out in a straight row fashion. Further, the locations of the keys in the angled rows have been optimized to facilitate thumb-typing. Since handheld electronic devices are generally typed on by employing the thumbs, a narrower handheld electronic device in accordance with the invention will require less movement of the thumbs when typing. Further, the angled rows allow for a different, more natural pattern of thumb movement. Also, by arranging the keys in a given row of the keyboard 14 along an arc or a convex line of curvature, the user's thumb performs a series of arc-like movements which is more natural and less tiresome for the user. In addition, by reducing the width of the handheld device, the user can hold the device in the palm of one hand and use the fingers of the other hand to type on the keyboard 14 if the user does not want to type with their thumbs. Further, the width reduction of the keyboard 14 allows the shape of the device 10 to better approximate a mobile phone which is beneficial when the device 10 is used in that capacity.

Figure 3:
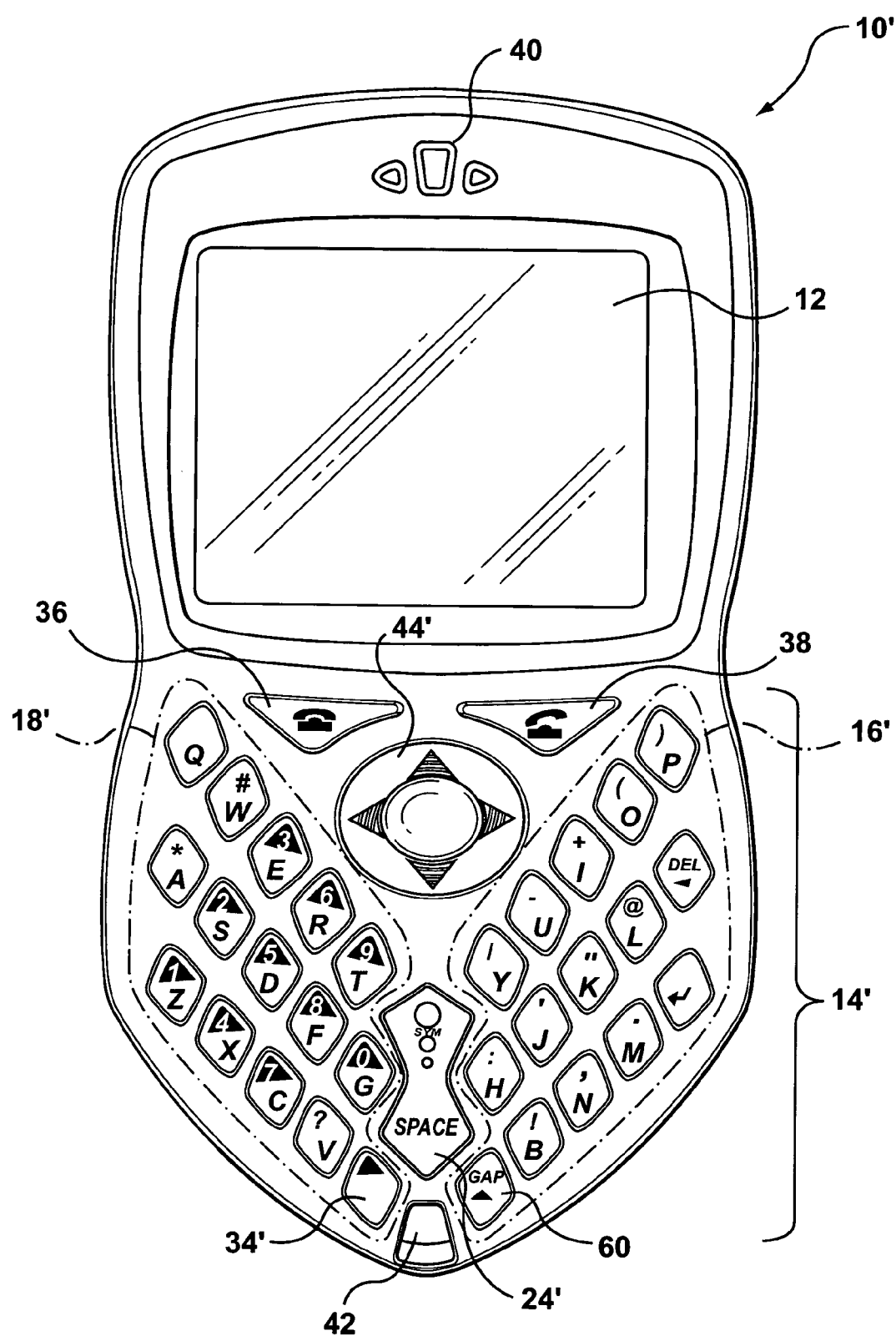

Referring now to FIG. 3, shown therein is an alternative embodiment of the handheld electronic device 10' with a slightly different keyboard 14'. In this case, the keyboard 14' maintains all of the geometrical properties of the keyboard 14. However, the keyboard 14' has a slightly different layout in terms of the functionality that is provided by the keys in the first and second groups of keys 16' and 18'. For instance, the ALT key 34' is situated just at the left of the aperture 42. In addition, the keyboard 14' includes a spacebar key 24' with a SYM functionality. To access the SYM functionality, the spacebar key 24' is depressed at the same time as the ALT key 34'. The SYM functionality provides access to several characters that are not directly provided by the keyboard 14' such as $, %, >>, &, etc. by displaying the symbols on the display 12 and allowing the user to select one of the characters. The keyboard 14' also includes a shift key 60 just to the right of the aperture 42 and different placement of the numerical secondary characters provided by the keys in the second group of keys 18. The secondary function of the shift key 60 is to provide caps lock mode. The device 10' also includes a slightly different navigation pad 44' that functions similarly to navigation pad 44.

It should be understood that various modifications can be made to the embodiments described and illustrated herein, without departing from the present invention, the scope of which is defined in the appended claims. For instance, the invention can also be used with foreign language keyboard layouts such as the AZERTY and QWERTZ keyboard layouts.

The invention claimed is:

1. A handheld electronic device configured for thumb-typing by a user, the handheld electronic device comprising:
   a) a display; and
   b) a keyboard comprising a first group of keys, a second group of keys, and a spacebar key vertically disposed in between the first and second groups of keys, wherein the first and second groups of keys are arranged into a plurality of rows, each of the plurality of rows making an angle generally between 30 and 50 degrees with respect to a longitudinal midline of the device and wherein the first and second groups of keys are located on opposite sides of the midline.

2. The handheld electronic device of claim 1, wherein each group of keys comprises a first row of keys, a second row of keys and a third row of keys, the first row of keys being disposed above the second row of keys and the second row of keys being disposed above the third row of keys, the first row of keys making a first angle with respect to the longitudinal midline, the second row of keys making a second angle with respect to the longitudinal midline and the third row of keys making a third angle with respect to the longitudinal midline, wherein the first, second and third angles are substantially similar.

3. The handheld electronic device of claim 1, wherein each group of keys comprises a first row of keys, a second row of keys and a third row of keys, the first row of keys being disposed above the second row of keys and the second row of keys being disposed above the third row of keys, the first row of keys making a first angle with respect to the longitudinal midline, the second row of keys making a second angle with respect to the longitudinal midline and the third row of keys making a third angle with respect to the longitudinal midline, wherein the third angle is larger than the second angle and the second angle is larger than the first angle.

4. The handheld electronic device of claim 3, wherein the first angle is chosen to be between about 30 and 40 degrees.

5. The handheld electronic device of claim 3, wherein the second angle is chosen to be between about 34 and 44 degrees.

6. The handheld electronic device of claim 3, wherein the third angle is chosen to be between about 40 and 50 degrees.

7. The handheld electronic device of claim 1, wherein each of the keys in each row follow a convex line of curvature with respect to the bottom of the handheld electronic device.

8. The handheld electronic device of claim 1, wherein the spacebar key is contoured to mate with adjacent keys in the first and second group of keys.

9. The handheld electronic device of claim 1, wherein the device further comprises a navigation pad disposed in between the first and second group of keys.

10. The handheld electronic device of claim 1, wherein the keys in the first and second group of keys are diamond shaped.

11. A keyboard for use with a handheld electronic device, the keyboard comprising:
- a first group of keys;
- a second group of keys;
- a spacebar key vertically disposed between the first and second groups of keys, the spacebar key being contoured to mate with adjacent keys in the first and second groups of keys; and
- a navigation pad disposed in between the first and second groups of keys, wherein the first and second groups of keys are arranged into a plurality of rows, each of the plurality of rows making an angle generally between 30 and 50 degrees with respect to a longitudinal midline of the device and wherein the first and second groups of keys are located on opposite sides of the midline.

12. The keyboard of claim 11, wherein each group of keys comprises a first row of keys, a second row of keys and a third row of keys, the first row of keys being disposed above the second row of keys and the second row of keys being disposed above the third row of keys, the first row of keys making a first angle with respect to the longitudinal midline, the second row of keys making a second angle with respect to the longitudinal midline and the third row of keys making a third angle with respect to the longitudinal midline, wherein the third angle is larger than the second angle and the second angle is larger than the first angle.

13. The keyboard of claim 12, wherein the first angle is chosen to be between about 30 and 40 degrees.

14. The keyboard of claim 12, wherein the second angle is chosen to be between about 34 and 44 degrees.

15. The keyboard of claim 12, wherein the third angle is chosen to be between about 40 and 50 degrees.

16. The keyboard of claim 11, wherein each of the keys in each row follow a convex line of curvature with respect to the bottom of the handheld electronic device.

17. The keyboard of claim 11, wherein the keys in the first and second group of keys are diamond shaped.

18. The keyboard of claim 11, wherein keys representing letters in the keyboard are laid out according to one of a QWERTY layout, an AZERTY layout and a QWERTZ layout.

* * * * *